United States Patent [19]
Nankee, II et al.

[11] Patent Number: 5,815,828
[45] Date of Patent: Sep. 29, 1998

[54] METHOD OF MEASURING TEMPERATURE OF A CATALYTIC CONVERTER

[75] Inventors: Robert J. Nankee, II, Canton; George C. Mitchell, Brighton; Mark E. McMackin, Royal Oak, all of Mich.

[73] Assignee: Chrysler Corporation, Auburn Hills, Mich.

[21] Appl. No.: 889,269

[22] Filed: Jul. 8, 1997

[51] Int. Cl.[6] .................................................. G01M 15/00
[52] U.S. Cl. ........................... 701/109; 60/276; 73/23.32; 73/118.1
[58] Field of Search ............................... 73/23.31, 23.32, 73/116, 117.2, 117.3, 118.1, 118.2; 60/276, 277; 701/109, 103

[56] References Cited

U.S. PATENT DOCUMENTS

| | | | |
|---|---|---|---|
| 5,216,880 | 6/1993 | Aoki et al. | 60/277 |
| 5,365,216 | 11/1994 | Kotwicki et al. | 73/118.2 |
| 5,427,070 | 6/1995 | Thomas et al. | 123/488 |
| 5,431,043 | 7/1995 | Gugel et al. | 73/23.31 |
| 5,431,044 | 7/1995 | Kiess et al. | 73/117.3 |
| 5,497,655 | 3/1996 | Gee et al. | 73/117.3 |
| 5,509,267 | 4/1996 | Theis | 60/277 |
| 5,517,848 | 5/1996 | Hosoya et al. | 73/118.1 |
| 5,693,877 | 12/1997 | Ohsuga et al. | 73/118.1 |

*Primary Examiner*—George M. Dombroske
*Attorney, Agent, or Firm*—Mark P. Calcaterra

[57] ABSTRACT

A method of measuring temperature of a catalytic converter in a motor vehicle includes the step of determining a first oxygen sensing mechanism output, determining if it is time to determine a second oxygen sensing mechanism output, and determining the second oxygen sensing mechanism output if it is time to determine the second oxygen sensing mechanism output. The method also includes the step of determining a change in oxygen sensing mechanism output by taking a difference between the first oxygen sensing mechanism output and the second oxygen sensing mechanism output. The method further includes the step of finding a catalytic converter temperature in a look-up table using the change in oxygen sensing mechanism output, and using the catalytic converter temperature as needed by an electronic control mechanism to operate an engine of the motor vehicle.

19 Claims, 2 Drawing Sheets

Range In O₂ Sensor Voltage Vs. Temperature

| Change In O₂ Voltage | Temperature °C |
|---|---|
| 0.5 | 75 |
| 1.0 | 175 |
| 1.5 | 250 |
| 2.0 | 340 |
| 2.5 | 425 |

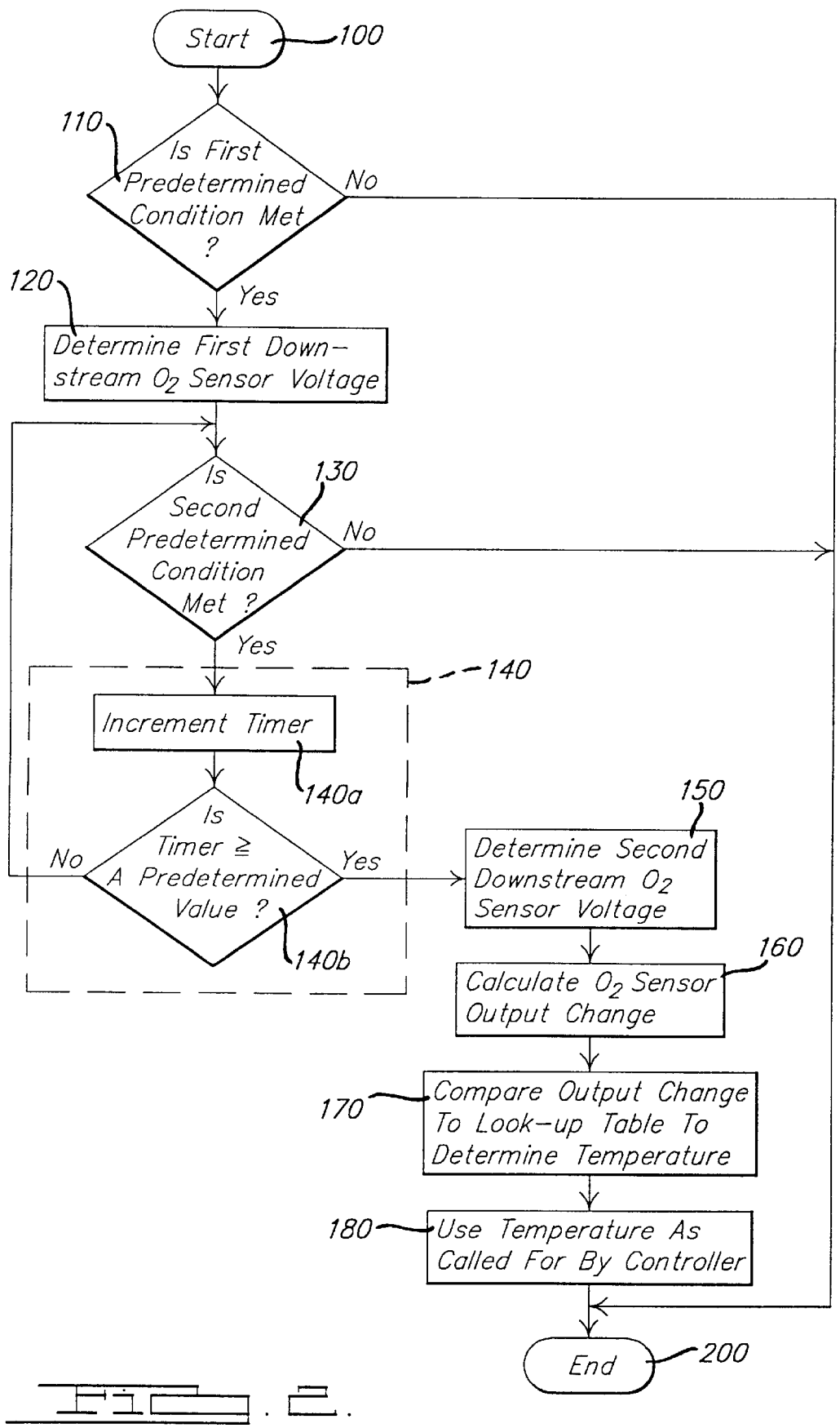

METHOD OF MEASURING TEMPERATURE OF A CATALYTIC CONVERTER

BACKGROUND OF THE INVENTION

1. Field of the Invention

The present invention relates generally to catalytic converters and, more particularly, to a method of measuring temperature of a catalytic converter in a motor vehicle.

2. Description of the Related Art

Motor vehicle tailpipe exhaust emissions have been significantly reduced by the inclusion of a catalytic converter in an exhaust system. The catalytic converter transforms undesirable constituents in the exhaust gas into harmless components through a chemical reaction. The efficiency level of the catalytic converter may decrease over time due to factors such as age, engine misfire, a faulty oxygen sensor, poisoning or prolonged high temperature operation. Therefore, the ability to monitor a catalytic converter parameter such as temperature is an indicator of the functionality of the catalytic converter.

The temperature near or within the catalytic converter is measurable through the strategic placement of a temperature sensing device, such as a thermocouple, as is well known in the art. For example, the placement of a thermocouple in the exhaust system before the catalytic converter provides an indication of the temperature of the exhaust gas before it enters the catalytic converter. Positioning a thermocouple in the exhaust system after the catalytic converter provides an indication of the temperature within the catalytic converter. One disadvantage of the current system is in the use of a dedicated temperature sensing device. Therefore, there is a need in the art for a method of measuring the temperature of the catalytic converter that does not require a separate temperature sensing device.

SUMMARY OF THE INVENTION

It is, therefore, one object of the present invention to provide a method for measuring temperature of a catalytic converter in a motor vehicle.

It is another object of the present invention to provide a method for measuring temperature of a catalytic converter utilizing an oxygen sensing mechanism.

It is yet another object of the present invention to provided a method for measuring temperature of a catalytic converter to predict at what temperature the catalytic convert will light-off.

To achieve the foregoing objects, the present invention is a method for measuring temperature of a catalytic converter in a motor vehicle. The method includes the steps of determining a first oxygen sensing mechanism output, determining if it is time to determine a second oxygen sensing mechanism output, and determining the second oxygen sensing mechanism output if it is time to determine the second oxygen sensing mechanism output. The method also includes the step of determining a change in oxygen sensing mechanism output by taking a difference between the first oxygen sensing mechanism output and the second oxygen sensing mechanism output. The method further includes the step of finding a catalytic converter temperature in a look-up table using the change in oxygen sensing mechanism output, and using the catalytic converter temperature as needed by an electronic control mechanism to operate an engine of the motor vehicle.

One advantage of the present invention is that a method is provided for measuring temperature of a catalytic converter in a motor vehicle from exhaust gas using an oxygen sensing mechanism positioned before or after the catalytic converter. Another advantage of the present invention is that the use of the oxygen sensing mechanism to measure temperature eliminates the need for a dedicated temperature sensing device. Yet another advantage of the present invention is in using the catalytic converter temperature to determine whether a light-off temperature has been attained. Other objects, features and advantages of the present invention will be readily appreciated as the same becomes better understood after reading the subsequent description when considered in connection with the accompanying drawings.

BRIEF DESCRIPTION OF THE DRAWINGS

FIG. 2 is a flowchart of a method for measuring temperature of a catalytic converter, according to the present invention, for the emission control system of FIG. 1.

DESCRIPTION OF THE PREFERRED EMBODIMENT(S)

Figure 1:
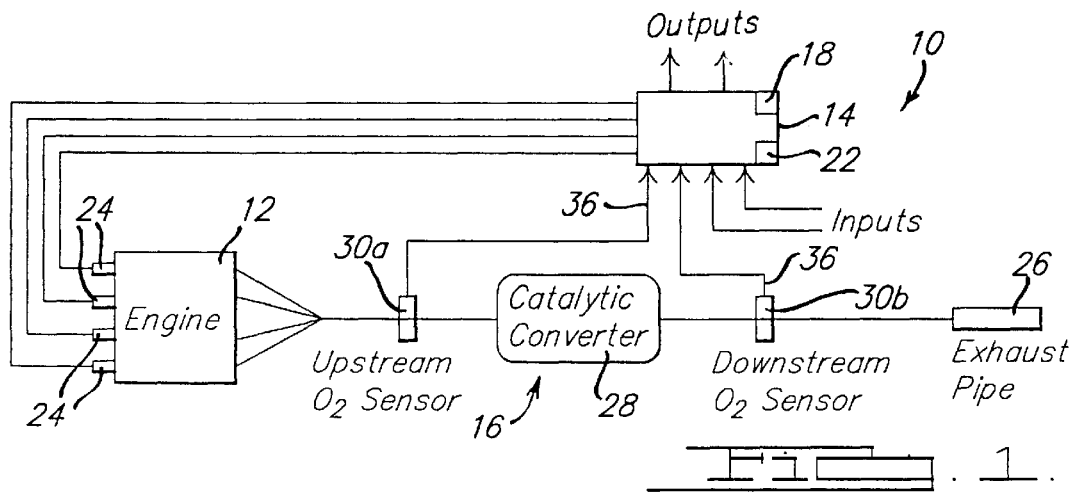
FIG. 1 is a schematic diagram of an emission control system used in conjunction with a method for measuring temperature of a catalytic converter, according to the present invention.

Referring to FIG. 1, an emission control system 10 for a motor vehicle (not shown) is illustrated. The emission control system 10 includes an engine 12, an electronic control mechanism 14, an exhaust system 16, as well as other components that are not shown but are nonetheless well known in the art.

The electronic control mechanism 14, such as an engine controller, is in communication with the engine 12. The electric control mechanism 14 controls the engine 12 and engine-related tasks such as maintaining fuel to air ratio, spark timing, and exhaust gas recirculation.

The electronic control mechanism 14 includes a microprocessing unit, memory 18, timing mechanism 22, inputs, outputs, communication lines and other hardware and software as is well known in the art. An example of a timing mechanism 22 is a timer, as is well known in the art. The memory 18 includes a table 20 (FIG. 3), such as a look-up table containing a predetermined array of values, that is utilized by the method to be described.

The emission control system 10 also includes at least one, preferably a plurality of fuel injectors 24 in cooperation with the engine 12, that provide a metered amount of fuel to the engine 12 based upon a signal from the electronic control mechanism 14. The resulting combustion process occurring within the engine 12 produces an exhaust gas. The constituents of the exhaust gas include hydrocarbon, carbon monoxide and oxides of nitrogen, all of which are known to have a potentially detrimental effect on air quality. The exhaust gas exits the engine 12, passes through the exhaust system 16 and is emitted into the air.

The exhaust system 16 includes an exhaust pipe 26 for transporting the exhaust gas from the engine 12 into the air. The exhaust system 16 also includes a catalytic converter 28 operatively disposed between the engine 12 and exhaust pipe 26 and the exhaust gas passes through the catalytic converter 28. Measuring a temperature of the exhaust gas at the inlet of the catalytic converter 28 provides an indication of the temperature of the exhaust gas prior to entering the catalytic converter 28. Similarly, measuring the temperature of the exhaust gas at the outlet of the catalytic converter 28 provides an indication of the temperature within the catalytic converter 28.

The catalytic converter 28 contains material which acts as a catalyst, as is well known in the art, to reduce or oxidize the components of the exhaust gas into harmless gasses. An efficiency of the catalytic converter 28 is a measure of how effective the catalytic converter 28 is in converting the exhaust gas into harmless gasses. The catalytic activity within the catalytic converter 28 tends to increase with the increasing efficiency level of the catalytic converter 28. At a predetermined efficiency level, such as fifty percent (50%), the catalytic converter 28 is considered suitably active. The temperature within the catalytic converter 28 corresponding to the attainment of the predetermined efficiency level is well known in the art as a light-off temperature.

During a cold start of the engine 12, the temperature of the exhaust gas is low. While the engine 12 is warming up, the temperature of the exhaust gas increases. Likewise, the increasing temperature of the exhaust gas corresponds with the increasing temperature within the catalytic converter 28. As the catalytic converter 28 warms up, it becomes increasingly more efficient. For example, a light-off temperature, such as 350–400° F., indicates that the catalytic converter 28 is at least fifty percent efficient.

The emission control system 10 further includes an oxygen sensing mechanism, such as an oxygen sensor, for measuring a level of oxygen in the exhaust gas. In this example there is an upstream oxygen sensor 30$a$ and a downstream oxygen sensor 30$b$. The upstream oxygen sensor 30$a$ is positioned in the exhaust system 16 in front or upstream of the catalytic converter 28. Similarly, the downstream oxygen sensor 30$b$ is positioned in the exhaust system 16 after or downstream of the catalytic converter 28. The oxygen sensors 30$a$, 30$b$ provide an output signal 36, which in this example is in the form of a voltage. The output signal 36 from the oxygen sensor 30$a$, 30$b$ is communicated to the electronic control mechanism 14. It should be appreciated that the emission control system 10 may also include other sensors, transducers or the like that are likewise in communication with the engine control mechanism 14 to further carry out a method, according to the present invention, to be described.

Referring to FIG. 2, a method for measuring a temperature of the catalytic converter 28, according to the present invention, is illustrated. The methodology begins or starts in bubble 100 after being called for by the electronic control mechanism 14. It should be appreciated that, in this example, the method is called for during a cold start of the engine 12. From bubble 100, the methodology advances to diamond 110.

In diamond 110, the methodology determines whether a first predetermined condition is met. An example of a first predetermined condition is if the engine 12 of the motor vehicle is in a cold start mode, such as if the engine coolant temperature is less than 70° F. If the first predetermined condition is not met, the methodology advances to bubble 200 and ends or exits the routine. If the first predetermined condition is met, the methodology advances to block 120.

In block 120, the methodology determines a first oxygen sensor output. In this example, the oxygen sensor is the downstream oxygen sensor 30$b$, and the methodology determines a first downstream $O_2$ sensor voltage in order to determine the temperature within the catalytic converter 28. From block 120, the methodology advances to diamond 130. It should be appreciated that use of the upstream oxygen sensor 30$a$ would indicate the temperature of the exhaust gas prior to entering the catalytic converter 28.

In diamond 130, the methodology determines if a second predetermined condition is met. An example of a second predetermined condition is if a speed of the engine 12, measured in revolutions per minute (RPM), is between idle or 1200 RPM and wide open throttle or 4000 RPM. Another example of a second predetermined condition is if a manifold absolute pressure (MAP), as is well known in the art, is within a predetermined range, such as 350–450 Torr. If the second predetermined condition is not met, the methodology advances to bubble 200 previously described. If the second predetermined condition is met, the methodology advances to block 140.

In block 140, the methodology determines if it is time to determine a second oxygen sensor output. For example, the methodology determines if it is time to determine a second oxygen sensor output by incrementing the timer 22 in block 140$a$ and determining if a value stored in the timer 22 is greater than a predetermined value in diamond 140$b$. If the value stored in the timer 22 is not greater than the predetermined value, the methodology returns to diamond 130. If the value in the timer 22 is greater than the predetermined value, the methodology advances to block 150.

In block 150, the methodology determines a second oxygen sensor output. In this example, the second oxygen sensor output is determined from the output voltage from the downstream oxygen sensor 30$b$. The methodology then advances to block 160.

In block 160, the methodology determines or calculates a change in oxygen sensor output by comparing the first oxygen sensor output to the second oxygen sensor output. For example, the change in oxygen sensor output can be expressed as the difference between the first oxygen sensor voltage and the second oxygen sensor voltage. The methodology advances to block 170.

In block 170, the methodology compares the change in oxygen sensor output to a look-up table 20 stored in the electronic control mechanism 14 to obtain a corresponding temperature of the catalytic converter 28. The methodology advances to block 180. In block 180, the temperature is stored in the memory 18 of the electronic control mechanism 14 until called for to operate the engine 12. The methodology advances to bubble 200 and ends.

Figure 3:
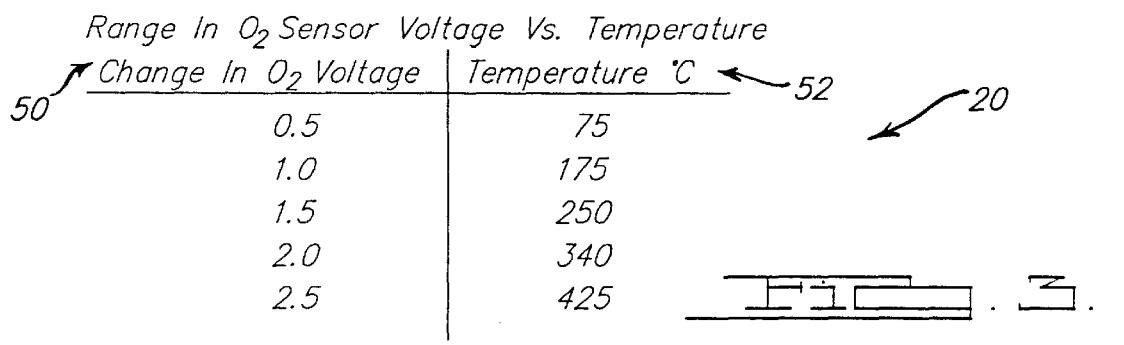
FIG. 3 is a look-up table used in conjunction with the method of FIG. 2.

FIG. 3 is an example of a look-up table 20. The look-up table 20 includes a first array of values 50 representing the change in oxygen sensor output, which in this example is a voltage ranging from 0.5 to 2.5 volts. The look-up table 20 also includes a second array of values 52 representing catalytic converter temperature, which in this example is between 75–425° C. It should be appreciated that in this example the first array of values 50 and the second array of values 52 are experimentally derived. The change in oxygen sensor output is compared to the voltage in the first array of values 50 and to the corresponding temperature from the second array of values 52, to establish the temperature of the catalytic converter 28.

Figure 4:
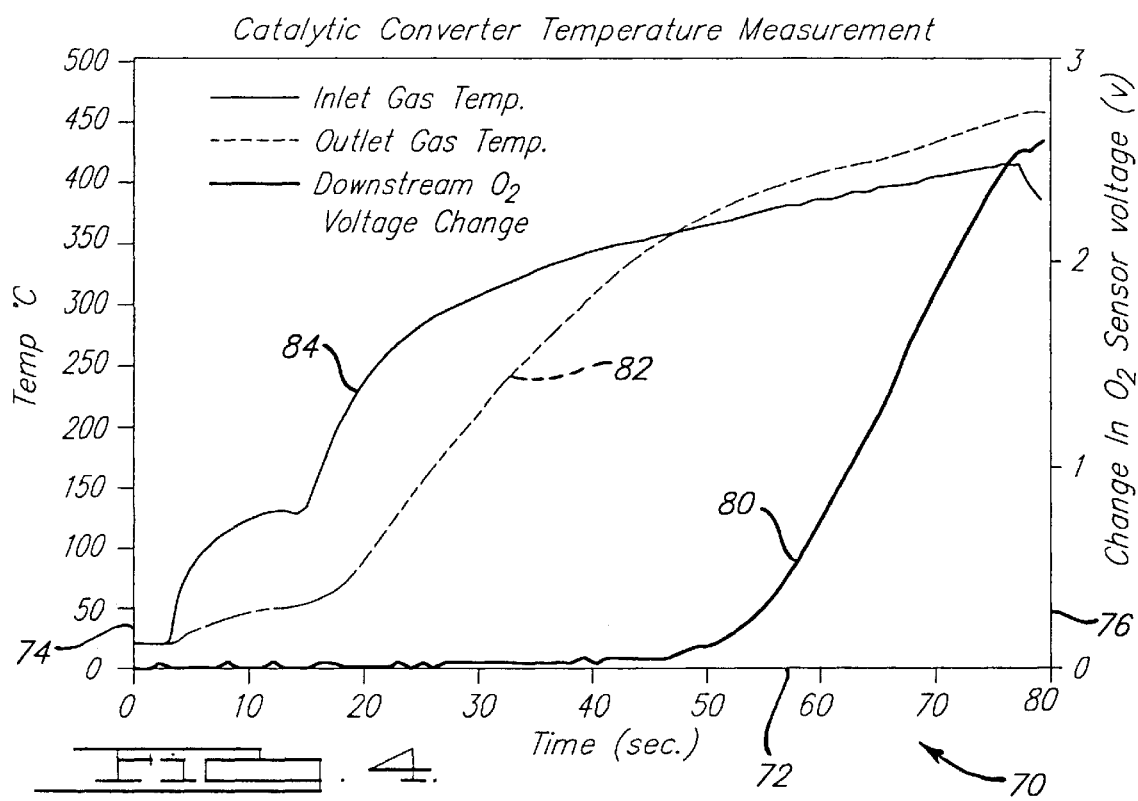
FIG. 4 is a graph of catalytic converter temperature and the change in oxygen sensing mechanism output over time.

Referring to FIG. 4, a graph 70 of a relationship between catalytic converter temperature and the change in oxygen sensing mechanism output over time is illustrated. It should be appreciated that in this example the oxygen sensing mechanism is an oxygen sensor, and its output is a signal measured as a voltage. The x-axis represents time 72 in units of seconds. The catalytic converter temperature 74 is represented by the y-axis in degrees C. Further, the change in oxygen sensor output 76 is represented by the z-axis as a voltage.

In graph 70, a first line 80, representing a change in oxygen sensor output, is determined from the method described in FIG. 2. By choosing a point on the first line 80, a corresponding temperature can be read from the y-axis 74. For comparison purposes, a temperature sensing mechanism such as a thermocouple was placed in the exhaust system 16. Thus, a second line 82 illustrates a change in temperature over time as measured at an outlet of the catalytic converter 28. A third line 84 illustrates a change in temperature over time as measured at an inlet of the catalytic converter 28. A comparison between the first line 80, the second line 82 and the third line 84 thus supports the use of the change in oxygen sensor output to determine catalytic converter temperature.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of measuring temperature of a catalytic converter in a motor vehicle, said method comprising the steps of:

measuring a first oxygen sensor output;

determining if it is time to determine a second oxygen sensor output using a timer;

determining the second oxygen sensor output if it is time to determine the second oxygen sensor output;

determining a change in oxygen sensor output by taking a difference between the first oxygen sensor output and the second oxygen sensor output;

finding a catalytic converter temperature in a look-up table using the change in oxygen sensor output; and sending the catalytic converter temperature to an electronic controller to operate an engine of the motor vehicle.

2. A method as set forth in claim 1 including the step of determining if a first predetermined condition is met prior to the step of determining the first oxygen sensor output.

3. A method as set forth in claim 1 including the step of determining if a second predetermined condition is met prior to the step of determining if it is time to determine a second oxygen sensor output.

4. A method as set forth in claim 1 wherein the oxygen sensor is an oxygen sensor having an output signal measured as a voltage.

5. A method as set forth in claim 1 wherein the step of determining if it is time using a timer comprises:

determining if the timer is greater than a predetermined value;

incrementing the timer if the timer is not greater than the predetermined value; and determining the second oxygen sensor output if the timer is greater than the predetermined value.

6. A method of measuring temperature of a catalytic converter in a motor vehicle, said method comprising the steps of:

determining if a first predetermined condition is met;

measuring a first oxygen sensor output if the first predetermined condition is met;

determining if a second predetermined condition is met;

determining if it is time to measure a second oxygen sensor output using a timer if the second predetermined condition is met;

measuring the second oxygen sensor output if it is time to measure the second oxygen sensor output;

determining a change in oxygen sensor output by taking a difference between the first oxygen sensor output and the second oxygen sensor output;

finding a catalytic converter temperature in a look-up table using the change in oxygen sensor output; and sending the catalytic converter temperature to an electronic controller to operate an engine of the motor vehicle.

7. A method as set forth in claim 6 wherein the first predetermined condition is if the engine is undergoing a cold start.

8. A method as set forth in claim 6 wherein the oxygen sensor is an oxygen sensor having an output signal measured as a voltage.

9. A method as set forth in claim 8 wherein the oxygen sensor is positioned downstream of the catalytic converter.

10. A method as set forth in claim 6 wherein the second predetermined condition is if the engine speed is between an idle and a wide open throttle speed.

11. A method as set forth in claim 6 wherein the second predetermined condition is if a manifold absolute pressure is within a predetermined range.

12. A method as set forth in claim 6 wherein the step of determining if it is time using a timer comprises:

determining if the timer is greater than a predetermined value;

incrementing the timer if the timer is not greater than the predetermined value; and determining the second oxygen sensor output if the timer is greater than the predetermined value.

13. A method as set forth in claim 6 wherein the look-up table includes a first array of values corresponding to a change in oxygen sensor output and a second array of values corresponding to catalytic converter temperature.

14. A method of measuring temperature of a catalytic converter in a motor vehicle having an electronic controller, said method comprising the steps of:

determining if a first predetermined condition is met;

measuring a first oxygen sensor output if the first predetermined condition is met;

initializing a timer;

determining if a second predetermined condition is met;

determining if it is time to measure a second oxygen sensor output if a second predetermined condition is met;

incrementing the timer if it is time to measure the second oxygen sensor output;

determining if the timer is greater than a predetermined value;

returning to the step of incrementing the timer if the timer is not greater than the predetermined value;

measuring the second oxygen sensor output if the timer is greater than the predetermined value;

determining a change in oxygen sensor output by taking a difference between the first oxygen sensor output and the second oxygen sensor output;

using the change in oxygen sensor output to look up a catalytic converter temperature from a look-up table of the change in oxygen sensor output corresponding to the catalytic converter temperature; and sending the catalytic converter temperature to an electronic controller to operate an engine of the motor vehicle.

15. A method as set forth in claim 14 wherein the first predetermined condition is if the engine is undergoing a cold start.

16. A method as set forth in claim 14 wherein the oxygen sensor is an oxygen sensor having an output measured as a voltage.

17. A method as set forth in claim 16 wherein the oxygen sensor is positioned downstream of the catalytic converter.

18. A method as set forth in claim 14 wherein the second predetermined condition is if the engine speed is between an idle and a wide open throttle speed.

19. A method as set forth in claim 14 wherein the second predetermined condition is if a manifold absolute pressure is within a predetermined range.

* * * * *